(No Model.)
D. KOHN.
BICYCLE BELL.
No. 573,668. Patented Dec. 22, 1896.
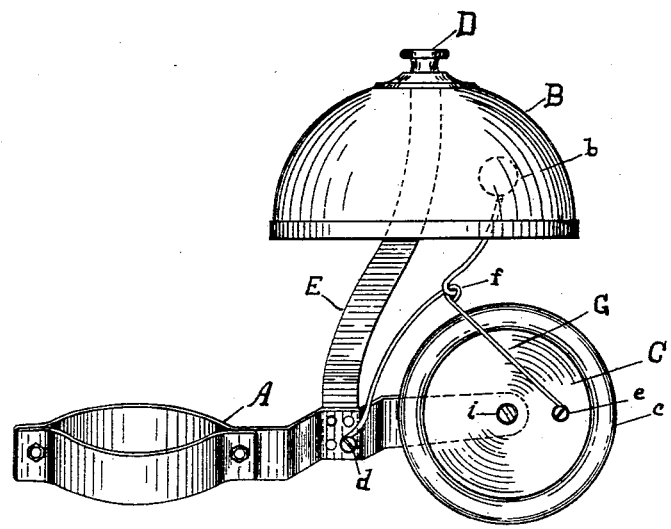
WITNESSES
J. A. Richmond.
O. Seiffert.
INVENTOR
David Kohn
by G. Rithman
Attorney

UNITED STATES PATENT OFFICE.

DAVID KOHN, OF PARIS, FRANCE.

BICYCLE-BELL.

SPECIFICATION forming part of Letters Patent No. 573,668, dated December 22, 1896.

Application filed September 17, 1896. Serial No. 606,138. (No model.)

*To all whom it may concern:*

Be it known that I, DAVID KOHN, a subject of the Emperor of Austria-Hungary, residing at 127 Boulevard Voltaire, Paris, France, have invented certain new and useful Improvements in Signal-Bells for Bicycles; and I do hereby declare the following to be a full, clear, and exact description of the invention, such as will enable others skilled in the art to which it appertains to make and use the same.

This invention relates to signal-bells for bicycles and similar vehicles, and has for its object to produce such a bell as will obviate the necessity and inconvenience riders have hitherto undergone of removing the hands from the handle-bars for the purpose of ringing the bell to warn pedestrians at the very time when a perfect control of the wheel is of the utmost importance. Many attempts have been made heretofore to construct such a bell, but they have generally proved more or less impracticable, being either too expensive or have failed in their object, and it remained for the present invention to remove the mentioned difficulties.

The improved bell is operated in a very simple manner. The rider merely presses with his foot upon a small cap or nut and by said pressure brings in contact with one of the wheels of the bicycle, preferably the front wheel, a small wheel so arranged as to ring the bell by its rotation in consequence of said contact, which will be easily understood by reference to the accompanying drawing, showing in elevation my new bell unattached to a bicycle.

In the drawing, A represents a suitable metallic support which may be attached to the frame of a bicycle, preferably on the fork of the front wheel, in the well-known or in any convenient manner by clamping, &c. The said support is bent laterally and has riveted or otherwise secured in one of its bends an upright portion E and at its farthest end is adapted to receive a small wheel C.

The upright E is provided on its upper end with a bell or gong B of the ordinary kind, which is held firmly in position by a cap or nut D. The hammer consists of a wire lever, preferably of steel, having a clapper $b$ at the upper end and pivotally secured at its base near the lower end of the upright E by a screw $d$, and is bent in its middle to form a loop $f$.

As previously stated, the support A is provided at its farthest end with a small wheel C, having a rubber tire $c$. This wheel is adapted to revolve on the pin $i$, rigidly secured to the support A. Adjacent the center of the wheel C projects a pin $e$, which acts as a crank-pin, on which is secured one end of the wire G, serving as a pitman, the opposite end of which is fastened in the loop $f$ of the hammer $b$.

The bell is operated as follows: The rider, by pressing lightly on the cap D, causes the wheel C, owing to the springy character of the support A, to contact with the pneumatic tire of the front wheel of the bicycle. (When in normal position, the small wheel C is situated just far enough away to escape contact with the bicycle-wheel.) As a consequence of said contact the wheel C is revolved very swiftly, and the pin $e$, serving as a crank-pin, causes the pitman G to give to the lever of the hammer $b$ a vibratory motion, and at each revolution of the wheel C the characteristic double stroke of an electric bell is produced as the hammer $b$ (respectively the clapper) strikes each side of the bell in its forward and backward motion.

The cap D may be connected by a rod in any suitable manner with the brake, so that the rider in using the brake presses simultaneously the bell mechanism and wheel C against the rim of the front wheel and thus produces a ringing of the bell.

Having thus described my invention, what I claim as new, and desire to secure by Letters Patent, is—

In signal-bells for bicycles and the like a laterally-bent metallic support, adapted to be clamped or otherwise secured on the fork of a bicycle, an upright riveted at its lower end in one of the bends of said support, a bell mounted on the upper end of said upright and surmounted by a cap to rigidly hold it in position, a wire pivotally connected at its lower end to the support near the base of the upright, the said wire bent in its middle to form a loop and provided at its upper end with a clapper in combination with a wheel having a rubber tire, adapted to rotate at the farther end of the support by contact with the bicycle-wheel, a pin near the center of said wheel, a pitman secured at one end to said pin, and at the opposite end to the loop of the hammer, and adapted to produce a double stroke of the clapper at each revolution of the wheel, substantially as described and for the purpose hereinbefore set forth.

In testimony whereof I affix my signature in presence of two witnesses.

DAVID KOHN.

Witnesses:
FEDRIK GRAEF,
ARNOLD STAHL.